United States Patent

Clark et al.

[11] Patent Number: 5,969,851
[45] Date of Patent: Oct. 19, 1999

[54] APPARATUS FOR CONTROLLING THE POSITION AND DIRECTION OF A LASER BEAM

[75] Inventors: William G. Clark, Pittsford, N.Y.; Edward F. Gabl, Saline, Mich.

[73] Assignee: Clark-MXR, Inc., Dexter, Mich.

[21] Appl. No.: 08/984,276

[22] Filed: Dec. 3, 1997

Related U.S. Application Data

[62] Division of application No. 08/391,496, Feb. 21, 1995.

[51] Int. Cl.$^6$ .............................. H09S 3/08; H01S 3/094
[52] U.S. Cl. .......................... 359/345; 359/134; 372/71; 356/153
[58] Field of Search ................................. 359/134, 160, 359/341, 345; 250/214 L; 372/6, 71, 107; 356/153

[56] References Cited

U.S. PATENT DOCUMENTS 3,551,057  12/1970  Hamiltan et al. ........................ 356/123
4,939,739   7/1990  Hobart et al. ........................... 372/107
5,121,405   6/1992  Negus ...................................... 372/107
5,200,965   4/1993  Okuyama et al. ....................... 372/29
5,297,156   3/1994  Deacon .................................... 372/21

*Primary Examiner*—Nelson Moskowitz
*Attorney, Agent, or Firm*—Harter, Secrest & Emery LLP; Stephen B. Salai

[57] ABSTRACT

An apparatus for maintaining an electromagnetic beam, namely a laser beam, aimed at a particular point in space and aligned with a unique propagation path. The apparatus includes one or more adjustable beam steerers located in the propagation path, and first and second spaced apart beam position detectors arranged in the beam path. The beam steerer(s) are preferably adjustable along at least two orthogonal axes of rotation for controlling the propagation direction of the beam. Error signals from the position sensors are fed into a beam steerer controller connected to the beam steerer(s) for electro-mechanically adjusting the beam steerer. The method of the invention involves fixing the propagation path on an angularly adjustable beam steering surface so that the propagation path at a different unique point in space, such as a target, can be controlled by adjusting the angular orientation of that beam steerer.

11 Claims, 2 Drawing Sheets

APPARATUS FOR CONTROLLING THE POSITION AND DIRECTION OF A LASER BEAM

CROSS REFERENCE TO RELATED INVENTIONS

This application is a division of application Ser. No. 08/391,496 filed Feb. 21, 1995, pending.

BACKGROUND

The invention relates to an apparatus and method for stabilizing the pointing direction and position of an electromagnetic (EM) beam, namely a laser beam, at a unique, predetermined point in space, and more particularly, to an apparatus and method for controlling both the short and long term stability of the output of a laser-pumped laser by actively stabilizing the pump beam position and pointing direction within the active gain volume in the laser being pumped.

Many applications of laser beams require the beam to be directed to a specific point in space (a target) and to be accurately maintained in that position for a time needed to perform a specific function. The direction of the beam propagation path at that point in space may also need to be controlled. For example, in order to ensure the stable operation of laser-pumped lasers, it is often necessary to ensure a precise degree of overlap of the pump beam volume with the active gain volume of the laser being pumped for significant periods of time. This is especially true, for example, when the optical Kerr effect plays a role in mode-locking the laser-pumped laser, since even slight variations in the degree of overlap of the pump beam volume with the active gain volume can result in deleterious effects on laser operation.

Changes in the pump beam position in the gain medium of the laser-pumped laser arise from a number of factors. The changes can be induced by mechanical vibration and/or thermally induced expansion or distortion within the laser cavity of the pump laser itself. They can also result from mechanical vibration and/or thermally induced expansion or distortion of the optical components that the pump beam engages as it propagates to the active gain volume within the laser being pumped. Additional deleterious effects result from dimensional changes caused by mechanical vibrations and/or thermally induced expansion or distortion of the surface to which both lasers are attached, causing the pump laser beam to shift in position relative to the laser being pumped. Further operational defects can be caused by changes within the laser-pumped laser cavity which effect a positional shift of the active gain volume within the gain medium itself. In like manner, mechanical vibrations and/or thermally induced expansion or distortion can produce deleterious effects at the location where the laser beam is directed to perform a predetermined function.

Active and passive commercial systems are known for stabilizing the beam pointing direction of a laser beam with respect to the cavity of the laser pump source. Active systems generally comprise a single beamsplitter and single beam position sensor such as a quadrant detector, mounted or attached to the resonator of the pump laser. The beamsplitter and quadrant detector are arranged so that the beamsplitter directs a portion of the output beam onto the quadrant detector, the beam being fixed at a point within the cavity. The detector, along with associated hardware and electronics, provide a feedback signal that is used to make corrections to two orthogonal angular adjustments on a mirror in the resonator cavity of the pump laser for correcting its beam pointing direction. While this type of stabilization technique can be effective in stabilizing the beam pointing direction of the laser used to pump another laser, it addresses only part of the problem of drift in laser-pumped lasers because the point of reference where the quadrant detector is located is outside the cavity of the pump laser itself. Moreover, it fails to deal with the other sources of instabilities in laser pumped-lasers, mentioned above, that can shift the position of the pump beam within the active gain volume of the laser being pumped. Although a single beamsplitter, a quadrant detector and an actuated mirror can control the beam pointing direction of a laser beam, and thereby fix its position at a specific location, this approach is not capable of fixing the beam pointing direction at that location as well, which is crucial when beam drift is due to changes in pointing direction.

Included among the passive techniques used to stabilize the pointing direction and position of a laser beam at a specific point in space are the use of large, interlocking optical tables which provide a single surface for the laser source, processing optics and target; the use of vibration isolation legs to minimize the coupling of mechanical vibrations between the floor and the equipment in contact with the surface of the table; and the use of low expansion materials like Superinvar™ to reduce the sensitivity of components to thermal changes in the environment. Unfortunately, these types of systems are often very expensive, and have limited effectiveness.

Accordingly, the inventor has recognized a need for methods and equipment which accomplish the beam control and stabilization described above without the disadvantages of the existing systems that have been set forth.

SUMMARY

It is an object of the present invention to control the propagation path of a laser beam at a unique point in space.

It is a further object of the invention to minimize instabilities in the pump laser beam position within the active gain volume of a laser-pumped laser.

It is a still further object of the invention to increase both the short and long term stability of the output of a laser-pumped laser by actively stabilizing the pump laser beam propagation path within the active gain volume of the laser being pumped.

An apparatus for maintaining an EM beam aimed at a particular point in space and aligned with a unique propagation path comprises first and second spaced-apart beam position detectors which define the propagation path of the beam at the unique point in space; an adjustable beam steerer located in the beam path for directing the beam to the first and second position detectors; and a beam position controller that is responsive to a signal provided by the position detectors and that is operably connected to the beam steerer, for providing signal data from the detectors to the beam steerer for appropriate adjustment.

In one aspect of the invention, the first and second beam position detectors are each a flat, opaque surface having a small aperture therein. The detectors are mounted as is readily known in the art and each surface is oriented perpendicular to the beam path, wherein the separation between the two apertures defines a straight line. Depending upon the separation distance between the apertures, the beam at the unique point in space will have a predefined propagation path.

In another aspect of this embodiment, the first and second beam position detector each comprises a beam splitter for dividing an incident beam into two subsequent beams, and a beam position measuring device, such as a quadrant detector or similar sensor known to those skilled in the art, located in a subsequent path of each of the two beam splitters, respectively.

In each aspect of the invention just described, the apparatus includes a beam steerer controller that receives beam position signals from the sensors and provides for electro-mechanical adjustment of the beam steerer via one or more actuators in response to those signals.

In a preferred aspect of this embodiment, the adjustable beam steerer includes a reflective optical element such as a mirror, having at least one adjustable axis of rotation responsive to the controller. The beam steerer will preferably have two, orthogonal, angularly adjustable axes of rotation. When the beam steerer is a single component, the beam steerer will additionally be adjustable in linear translation via an actuator to fully provide position and direction control of the laser beam as it propagates from said beam steerer. Mounting and adjustment mechanisms for the beam steerer are well known in the art and require no further elaboration here.

In another embodiment of the invention, an apparatus for maintaining an EM beam aimed at a particular point in space and aligned with a unique propagation path comprises a first adjustable beam steerer located at a point in the propagation path for controlling the direction of the beam from the first beam steerer; a first beam position detector arranged to receive a portion of the beam from a first location in the propagation path for providing an error signal corresponding to a displaced location of the beam on the detector relative to a reference signal corresponding to a known location of the beam on the detector; a second adjustable beam steerer located at a spaced apart point from the first beam steerer in the propagation path for controlling direction of the beam from the second beam steerer; a second beam position detector arranged to receive a portion of the beam from a second location in the propagation path for providing a different error signal corresponding to a displaced location of the beam on the second detector relative to a different reference signal corresponding to a known location of the beam on the second detector; and a beam steerer controller interfacing the first detector and the first beam steerer and the second detector and the second beam steerer, wherein the error signals from the first and second detector are provided to the first and second beam steerer via the controller to maintain the beam at a first given location on the second beam steerer, the given location corresponding to the reference signal location on the first detector, and to maintain the beam at a second given location on a target, wherein the second given location corresponds to the reference signal location of the beam on the second detector.

In one aspect of this embodiment, the first and second beam steerers are reflective optical elements each having at least one axis of rotation that is adjustable in angular orientation. In this embodiment, a first beam divider is located at the first location in the beam propagation path for providing a portion of the beam for the first position measuring device, and a second beam divider is located at the second location in the beam path for providing another portion of the beam for the second position measuring device.

In a preferred aspect of this embodiment, the first beam position measuring device is arranged in the split off portion, or second propagation path, at a given distance from the first beam divider and provides an error signal S' corresponding to a displaced location of the second propagation path relative to a reference location corresponding to a signal S; the second adjustable beam steerer is located at a second position in the beam path at substantially the given distance from the first beam divider for controlling the angular direction of the beam from the second beam steerer, and a second beam divider arranged at a second point in the propagation path for creating a third propagation path in which a second beam position measuring device is arranged at a given distance from the second beam divider for providing an error signal T' corresponding to a displaced location of the beam path on the second detector relative to a reference location corresponding to a signal T; wherein the signals from the first and second position measuring device are used to adjust the beam steerers, via the beam steerer controller, for maintaining the desired position and direction of the beam at the particular point in space.

In another aspect of this embodiment, a beam position detector senses the beam position on a surface in the propagation path; for example, a second beam steering mirror, by detecting beam scatter off of that surface which has been imaged or focused on the detector by a reflective or refractive optical component arranged between the surface and the detector.

In a further embodiment, an apparatus for controlling the direction and angular orientation of a laser beam at a particular point in space includes an adjustable beam steerer having at least two orthogonal, angularly adjustable axes of rotation and an adjustable linear position; a first beam divider located in the beam path for creating a second beam path; a second beam divider located in either the original beam path or the second beam path for creating a third beam path; a first beam position measuring detector located in either the beam path or the second beam path for providing an error signal to a controller; a second beam position measuring detector located in either the beam path, the second beam path or the third beam path for providing another error signal to the controller corresponding to a displaced location of the beam on the second detector; and a controller operably connecting the position detectors and the beam steerer for adjusting the angular orientation and translation position of the beam steerer to control the position and angular orientation of the beam at the particular point in space.

The invention further comprises a method for controlling and maintaining the propagation path of a laser beam at a unique point in space, comprising the steps of first determining a displaced location of the beam at a first point in the beam path; continually adjusting the beam path direction to maintain the beam at the first point; determining a displaced location of the beam at a second point at the beam path; and continually adjusting the beam path direction from the first point to the second point to maintain a desired position and pointing direction of the beam at the unique point in space. As is well understood in the art, the beam propagation direction can be continually adjusted by generating an error signal relative to a reference signal corresponding to the position of the beam on a beam position detector and using one or more said signals to adjust one or more beam steering components. As is further well understood, error signals can be obtained either directly from a sensor located in a portion of the propagation path, or indirectly by imaging or focusing scattered radiation via appropriate components from a surface in the propagation path on the detector.

The invention along with the aforementioned objects and advantages will now be clearly set forth with reference to the detailed drawings which are described as follows:

DETAILED DESCRIPTION

Figure 1:
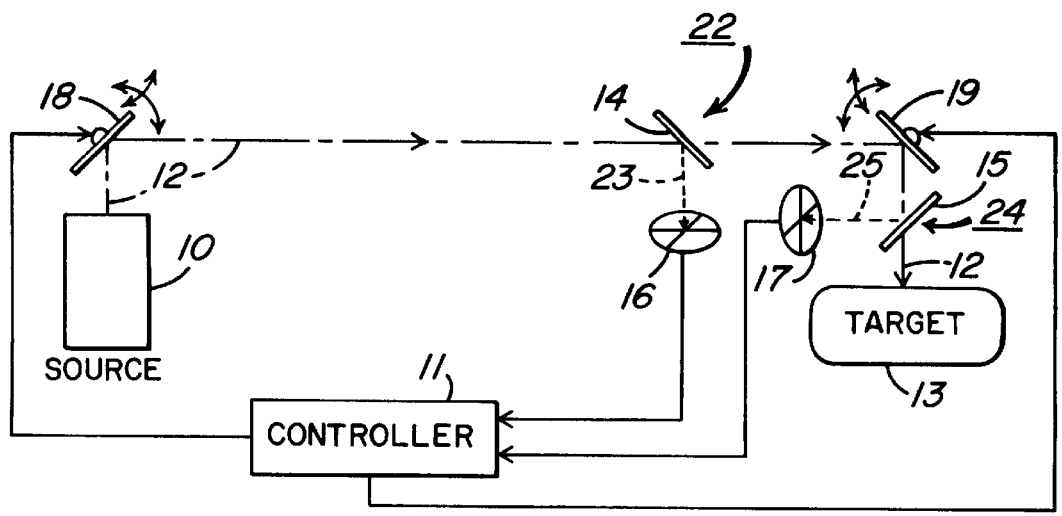
FIG. 1 is a schematic plan view of a version of the invention showing two angularly adjustable beam steerers, two beam dividers, two beam position detectors and a beam steerer controller for adjusting the beam steerers in response to error signals generated by the beam position detectors.

A preferred version of the invention is shown in FIG. 1. An EM source such as a laser 10, emits a beam 12 along an initial propagation path. A first adjustable beam steerer 18 is located at a first point in the propagation path 12 as shown from which the propagation path is controlled. Although beam steerer 18 is shown having an axis of rotation that is normal to the plane of the paper, those skilled in the art will appreciate that the beam steerer 18 will preferably have a second, orthogonal, adjustable axis of rotation to adequately compensate for instabilities in the beam 12 in three dimensions. A beam divider, or splitter, 14 is arranged in a stationary orientation at a first location 22 in the propagation path and divides the beam into the original beam path 12 and a second propagation path 23. A beam position sensor, such as a quadrant detector, 16, is located in the second propagation path 23 at a given distance, x, from beam divider 14. The operation of quadrant detectors and similar beam position measuring devices are well known to those skilled in the art and require no further discussion here other than to note that an error signal S', proportional to a displaced location of the beam on the detector relative to a known location corresponding to a reference signal S, is to a beam steerer controller 11 which controls one or more actuators (not shown) connected to beam steerer 18 to adjust the position of the beam at the first location 22. A second adjustable beam steerer 19, similar in operational detail to beam steerer 18, is located in beam path 12 preferably at a distance from beam divider 14 that is the same as the given distance between beam divider 14 and position sensor 16. In this manner, the displaced location of the beam path 23 on sensor 16 corresponds to the displaced position of beam path 12 on beam steerer 19. A second beam divider 15 is positioned in fixed orientation in beam path 12 at location 24 and passes a portion of original beam 12 to the desired unique point in space (target) while splitting off a second portion 25 of beam 12. A second beam position sensor 17 that is similar in operational detail to sensor 16 is located in beam path 25 and an error signal T' corresponding to a displaced position of beam path 25 on sensor 17 is sent to controller 11 for adjustment of the angular orientation of beam steerer 19 in response to T'.

An object of the invention is to stabilize the propagation path at a unique point in space (target) 13 so as to minimize the deleterious effects of beam motion relative to the target as described above. This is accomplished by first continuously adjusting beam steerer 18 so as to maintain beam path 12 at a fixed position on beam divider 14 through angular adjustment of beam steerer 18 via feedback of the error signal S' from sensor 16 to the controller 11. The hardware for mounting and adjusting beam steerers 18 and 19, and other electro-optical components described herein, is well known to those skilled in the art and requires no further description in this specification. The function of beam splitter 14 and sensor 16 is to fix the position of the beam 12 on the surface of beam steerer 19 so that all changes in position of the beam 25 at sensor 17 can be treated merely as angular adjustments which can be compensated for by controlling the angular orientation of beam steerer 19. In this manner, the propagation path 12 at the target 13 can be precisely controlled and maintained.

It will be appreciated by those skilled in the art that if the distance between second location 24 and target 13, and the distance between second location 24 and measuring device 17, is substantially the same, that sensor 17 is at a point conjugate with the target with respect to beam splitter 15 to further increase beam pointing and positioning accuracy.

Figure 4:
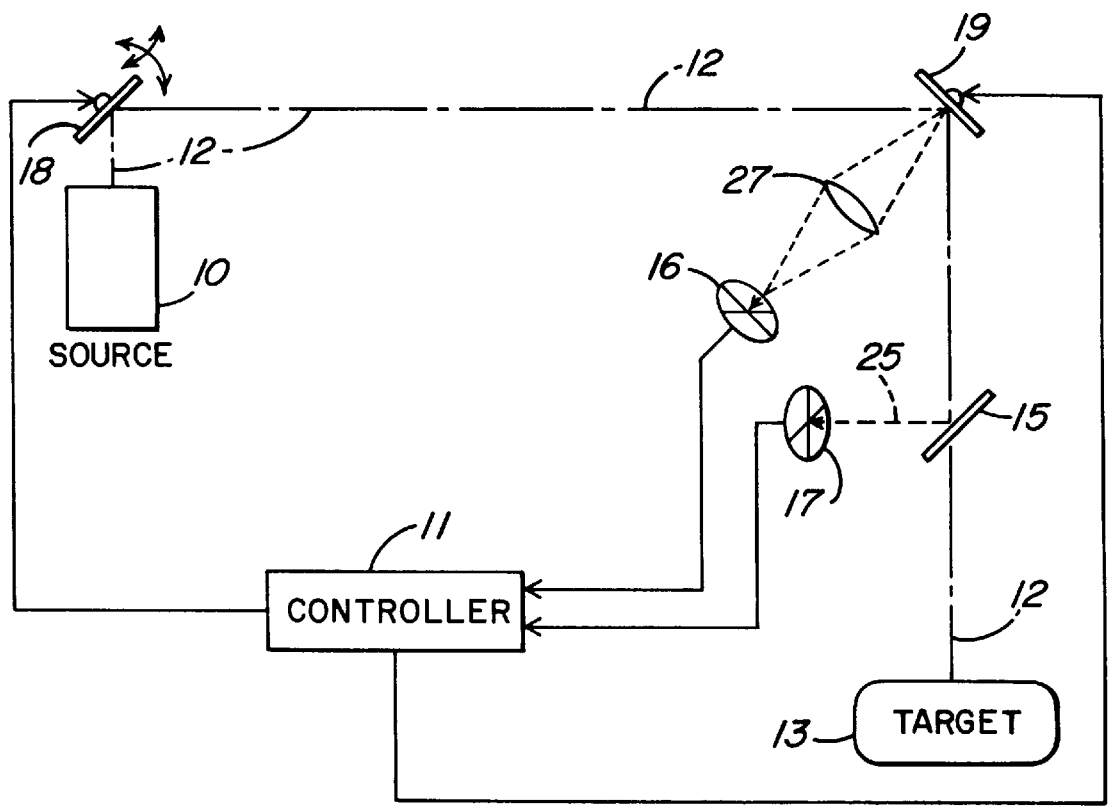
FIG. 4 is a schematic plan view of a version of the invention in which beam position is measured, in part, indirectly by imaging scatter from a surface in the propagation path onto a position sensor.

It will be further appreciated that the portion of the laser beam incident on either one or both of the sensors 16, 17 need not necessarily arise from the presence of a beam splitter 14 or 15; reflections from other surfaces may serve the same purpose. For example, as shown in FIG. 4, an optical component 77 is arranged intermediate second adjustable beam steerer 19 and position sensor 16. The component 77 includes a reflective or refractive element, as are well known in the art, which images or focuses the beam scatter from the surface of beam steerer 19 onto detector 16. Similarly, the target itself may be at least partially transmissive in which case the transmitted portion of the beam incident on a quadrant detector may serve to provide the required error signal, or, if the target is partially reflective, it would be possible to arrange the target so that reflection from it is incident on a position detector either directly or indirectly, to accomplish the same purpose.

Figure 2:
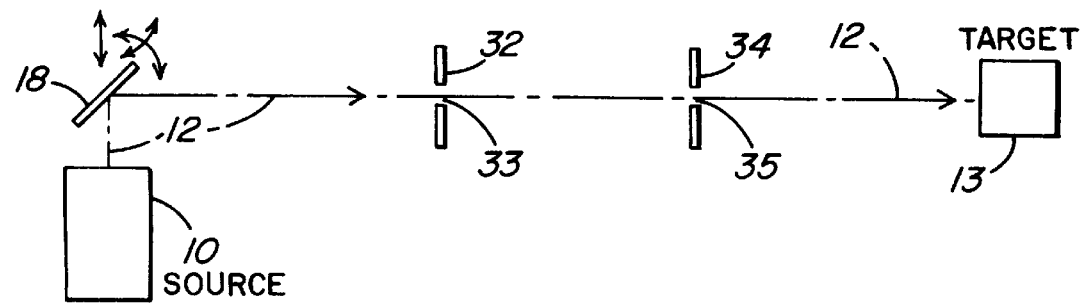
FIG. 2 is a schematic plan view of a version of the invention in which a beam steerer is linearly translatable in addition to being orthogonally angularly adjustable, and two spaced apart, apertured components define the propagation path of the beam.

In another embodiment of the invention shown in FIG. 2, a target is positioned in an undeflected propagation path 12 from a single beam steerer 18 that can be linearly translated by an actuator (not shown) with respect to source 10 in addition to being angularly adjustable about two orthogonal axes of rotation. In this embodiment, the beam position detectors can simply be two in-ine, spaced apart opaque surfaces each of which has a small aperture that will pass the beam when the beam is properly aligned with each aperture. The beam path 12 passing through aperture 35 of detector 34 will the have a predetermined propagation path. In this embodiment, instability in beam 12 emanating from source 10 can be suitably compensated for by the linear and angular degrees of freedom of beam steerer 18. Since beam position detectors 32, 34 are strictly passive components in this embodiment, it is contemplated that the position and angular orientation of beam steerer 18 would be manually adjusted to control the position and direction of the beam path at the target.

Figure 3:
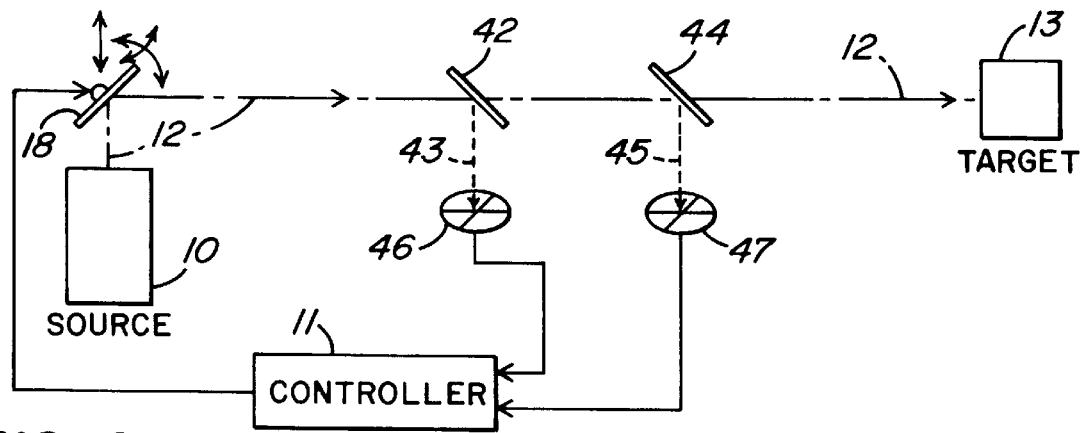
FIG. 3 is a schematic plan view of a version of the invention similar to that shown in FIG. 2 except that the apertured components are replaced by a pair of spaced apart beam dividers and associated beam position measuring devices for generating error signals to the beam steerer controller for electromechanical adjustment of the beam steerers.

FIG. 3 shows an embodiment similar to that shown in FIG. 2 with the additional provision for electromechanical adjustment of the beam steerer 18 via beam steerer controller 11. In this embodiment, beam detector 32 is replaced with a beam splitter 42 which passes a portion of beam 12 and reflects a portion of the beam along beam path 43 to a position sensor 46 which generates a signal for adjusting the orientation of beam steerer 18 through controller 11. Similarly, beam detector 34 in FIG. 2 is replaced by beam splitter 44 which passes a portion of the beam 12 and reflects a portion along beam path 45 to a second sensor 47. Regardless of the angular and/or positional distortion of the beam 12 from source 10, beam steerer 18 can be translated and or rotated accordingly to control the propagation path 12 at the target 13 via the error signals generated by sensors 46, 47, as is well understood by those skilled in the art.

The foregoing description of the invention is intended to be merely exemplary of the invention and those skilled in the art will appreciate that certain changes and modifications to the method and apparatus described above are well within the scope of the invention which is solely defined by the appended claims.

We claim:

1. A method for stabilizing a propagation path of a pump laser beam in a laser-pumped laser comprising the steps of:
   determining change in amount of overlap in position of the pump laser beam with respect to gain volume of the laser being pumped by said pump laser beam, and
   compensating for said change in amount of overlap in position by moving one of a reflective element and a refractive element in the path of said pump laser beam.

2. A method of stabilizing pointing direction of a pump laser beam, having a path, in a laser-pumped laser having a laser cavity with an optical axis, comprising the steps of:
   determining change in the pointing direction of the pump laser beam with respect to the optical axis of the cavity of the laser being pumped by said pump laser beam,
   compensating for said change in the pointing direction by moving at least one of a reflective element and a refractive element in the path of said pump laser beam.

3. The method of claim 1, wherein the step of determining change in amount of overlap is performed without redirecting or splitting the beam along the propagation path.

4. The method of claim 1, wherein the step of determining change in amount of overlap is performed through multiple beam detectors.

5. The method of claim 1, wherein the step of determining change involves the detection of light scattered from the beam.

6. The method of claim 1, wherein moving one of the reflective element and refractive element is done outside the resonator body of any laser.

7. The method of claim 2, wherein the step of determining change in the point direction is performed without redirecting or splitting the beam along the propagation path.

8. The method of claim 2, wherein the step of determining change in the point direction is performed through multiple beam detectors.

9. The method of claim 2, wherein the step of determining change involves the detection of light scattered from the beam.

10. The method of claim 2, wherein moving one of the reflective element and refractive element is done outside the resonator body of any laser.

11. A method of stabilizing a propagation path of a pump laser in a laser-pumped laser comprising the steps of:
    determining change in amount of overlap in position of the pump laser beam with respect to gain volume of the laser being pumped by said pump laser by detecting light scattered from the beam and compensating for said change in amount of overlap in position by moving one of a reflective element and a refractive element in the path of said pump laser beam.

* * * * *